United States Patent [19]
Krounbi et al.

[11] Patent Number: 5,588,199
[45] Date of Patent: Dec. 31, 1996

[54] LAPPING PROCESS FOR A SINGLE ELEMENT MAGNETORESISTIVE HEAD

[75] Inventors: Mohamad T. Krounbi; Hin P. E. Lee, both of San Jose; David J. Seagle, Morgan Hill, all of Calif.

[73] Assignee: International Business Machines Corporation, Armonk, N.Y.

[21] Appl. No.: 339,523

[22] Filed: Nov. 14, 1994

[51] Int. Cl.⁶ .................................................. G11B 5/42
[52] U.S. Cl. .................. 29/603.1; 29/603.15; 29/603.16
[58] Field of Search .......................... 29/603.09, 603.1, 29/603.15, 603.16

[56] References Cited

U.S. PATENT DOCUMENTS

| | | | |
|---|---|---|---|
| 4,155,106 | 5/1979 | Muraoka et al. | 360/112 |
| 4,689,877 | 9/1987 | Church | 29/603.1 |
| 4,785,366 | 11/1988 | Krounbi et al. | 360/113 |
| 4,914,868 | 4/1990 | Church et al. | 51/165.71 |
| 5,206,590 | 4/1993 | Dieny et al. | 324/252 |

Primary Examiner—Carl E. Hall
Attorney, Agent, or Firm—Leslie G. Murray

[57] ABSTRACT

A method of lapping magnetoresistive (MR) heads individually which provides an MR element having a desired height with minimized skew is described. During fabrication of the MR head, one or more shunt resistors are formed between the edge of the MR element and the head air bearing surface. The shunt resistors are electrically connected at each end to extensions of the MR electrical leads and connected to the MR element and to each other at points between the ends forming a resistor network. During lapping of the MR head, the resistance of the resistor network is measured by an Ohmmeter connected between the MR element leads. As portions of the shunt resistors are ground away, the changes in the measured resistance of the resistor network are used to monitor and control any skew in the lapping process.

3 Claims, 6 Drawing Sheets

LAPPING PROCESS FOR A SINGLE ELEMENT MAGNETORESISTIVE HEAD

BACKGROUND OF THE INVENTION

The present invention relates to a method and apparatus for the manufacture of thin film magnetic transducers and, more particularly, to a manufacturing and lapping process for individual magnetoresistive (MR) heads which eliminates the need for electrical lapping guides and provides an MR sensing element having a uniform element height. The present lapping process is particularly applicable to MR heads having relatively long MR sensing elements, such as MR heads for use with magnetic tape systems.

In high speed data processing systems, magnetic recording has been employed for large memory capacity requirements. In magnetic storage systems, data is read from and written on to magnetic recording media utilizing magnetic transducers commonly referred to as magnetic heads. In a magnetic disk drive system, for example, one or more magnetic recording disks are mounted on a spindle such that the disks rotate to permit the magnetic head mounted on a moveable arm in a position closely adjacent the disk surface to read or write information thereon.

During operation, an actuator mechanism moves the magnetic transducer to a desired radial position on the surface of the rotating disk where the head electromagnetically reads or writes datas. Typically, the magnetic head is integrally mounted in a carrier or support referred to as a "slider". The slider generally serves to mechanically support the head and any electrical connections between the head and the remainder of the disk drive system. The slider is aerodynamically shaped to glide over moving air and therefore to maintain a uniform distance from the surface of the rotating disk thereby preventing the head from undesirably contacting the disk.

In a disk drive system, a slider is typically formed with one surface having two parallel rails separated by a recessed area between the rails and with each rail having a ramp at one end. The surface of each rail that glides over the disk surface during operation is referred to as the air bearing surface. In contrast, in a tape drive system the slider air bearing surface is contoured providing a curved surface facing the magnetic tape media which, as a result of moving magnetic tape wrapped over the air bearing surface at high speed, forms a layer of air which prevents the tape from contacting the slider surface.

The magnetic head may be an inductive electromagnetic device including magnetic pole pieces which read the data from or write data onto the recording media. Alternatively, the magnetic head may include a magnetoresistive read element for separately reading the recorded data, while the inductive head serves only to write the data. In either case, the inductive head magnetic pole pieces and the MR head elements terminate on the air bearing surface and function to electromagnetically interact with the magnetic media.

In the manufacture of such magnetic read/write heads, a large number of sliders and heads are fabricated from a single wafer having rows of the magnetic transducers deposited simultaneously on the wafer surface utilizing semiconductor type process technology. After deposition of the magnetic heads is complete, single row/bars are sliced from the wafer, each bar comprising a row of magnetic head units which can be further processed into sliders having one or more magnetic transducers on their end faces. Sliders having a generally flat air bearing surface designed for use in rotating disk magnetic storage systems may be batch processed wherein a number of the sliders are further processed in rows as sliced from the wafer. Sliders designed primarily for use in magnetic tape storage systems commonly have curved or contoured air bearing surfaces and are required to be processed individually rather than in rows.

In order to achieve optimum efficiency from the magnetic heads, the sensing elements must have a pole tip height dimension commonly referred to as throat height for the thin film inductive heads, or element height in the case of the MR read heads, which must be maintained within a certain limited tolerance for generating an optimum signal from a given head element. During the slider processing, it is critical to grind or lap the slider to a desired thickness in order to achieve the desired throat height and MR element height for the magnetic head.

A method of producing a required element height includes a lapping stage in which an abrasive grinding surface accurately grinds the inductive pole tips and MR elements to a desired length (i.e., height). Suitable techniques for controlling the MR element height during the lapping operation include measuring the resistance of the MR element as it is lapped to the final element height. The change in resistance of the MR element at any given time during the lapping operation indicates the amount of the material that has been removed from the elements. Since the resistance of the MR element is proportional to the amount of MR material remaining, the resistance is an indication of the final element height of the MR element being lapped.

As discussed above, in an MR head oftentimes the MR element is used as the lapping guide to control the final height of the MR element. The resistance of the MR element is used to determine when the desired element height has been achieved. During the lapping process, the plane of the lapped surface can become skewed with respect to the MR element, resulting in one end of the MR element being higher than required and the other end being lower than required when the MR element is exhibiting the target resistance. This problem is not significant when lapping an array tape head or a row of sliders because multiple elements are being monitored. For example, U.S. Pat. No. 4,914,868, assigned to the instant assignee, discloses an apparatus and process for eliminating curvature, referred to as bow, in a row of magnetic transducers during lapping. As shown in FIG. 1, electronic lapping guides (ELG) are provided at each end of the row of magnetic transducers. A lapping skew is indicated when there is significant differences in the measured resistance of the ELGs located at the extreme ends of the row.

For magnetic heads which are lapped individually skew control is critical, particularly for some magnetic tape head designs wherein the MR element is long relative to its height. U.S. Pat. No. 4,155,106 issued May 15, 1979 discloses a magnetic head including plural leads for use during the manufacturing process to monitor the progress of the lapping operation. As shown in FIG. 4, the outer leads 14a on either side on the head are utilized with detector leads 15 and 16 to monitor the progress of the grinding operation. The described magnetic head requires that additional leads 14a be provided during manufacture of the head thus increasing the physical size of the head and reducing the number of heads that may be fabricated on a given wafer.

SUMMARY OF THE INVENTION

It is therefore a principal object of the present invention to provide a magnetic transducer including a magnetoresistive element wherein the skew in the height of the MR element is controlled.

It is a further object of the present invention to provide a magnetic head wherein the number of leads is minimized and the number of heads per wafer is maximized.

In view of the foregoing objects, the present invention provides a magnetic head including an MR element having one or more shunt resistors formed between the edge of the MR element and the surface of the slider, electrically connected to the MR element and to extensions of the MR element electrical leads forming a resistor network. During the lapping process, the resistance of the resistor network is measured by measuring means connected between the MR element electrical leads. As the lapping process progresses portions of the shunt resistors are ground away, and the changes in the measured resistance of the resistor network are used to monitor and control any skew in the lapping process. The final MR element height is determined by a measurement of the resistance of the MR element itself. During the lapping process the extended portion of the electrical leads and the shunt resistors are completely removed and a portion of the MR element is ground away. When the desired MR element height is reached, as determined by the measured resistance of the MR element, the lapping process is terminated. At the completion of the lapping process, the MR element is a rectangular shaped bar or stripe of the MR material having a desired height and an edge exposed at the air bearing surface.

As described above, the shunt resistors used for monitoring and controlling skew during the lapping process are electrically connected between extensions of the MR element electrical leads. Thus, no additional electrical leads are required allowing the number of individual magnetic heads fabricated on a given wafer to be maximized.

THE DESCRIPTION OF THE DRAWINGS

The foregoing and other objects, features and advantages of the present invention will be apparent from the following detailed description of the preferred embodiments of the invention, reference being made to the accompanying drawing in which like reference numerals indicate like parts and in which.

DETAILED DESCRIPTION OF THE PROFFERER EMBODIMENTS

Figure 1:
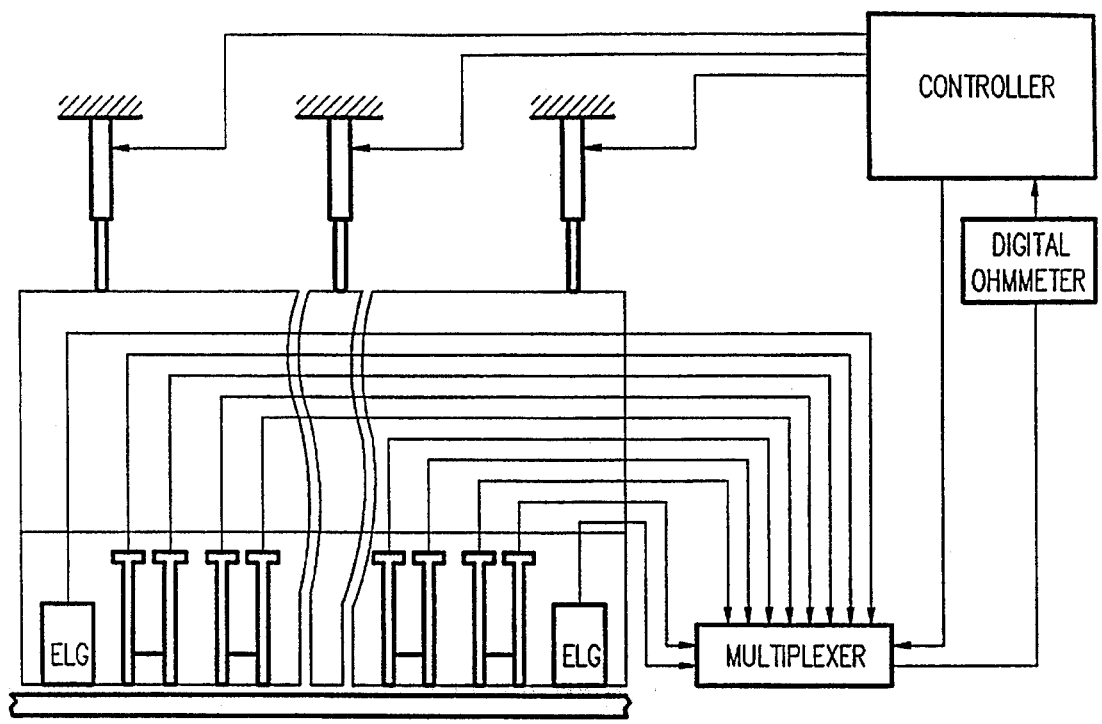
FIG. 1 is a system block diagram illustrating a prior art lapping system for lapping a row of multiple magnetic heads.
Figure 4:
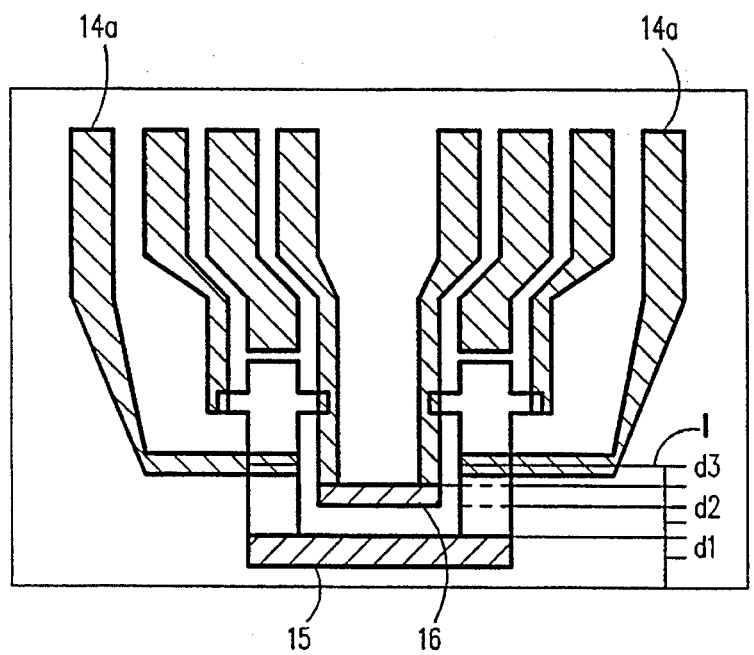
FIG. 4 is a plan view of a prior art magnetic head including leads for monitoring the lapping process.
Figure 2A:
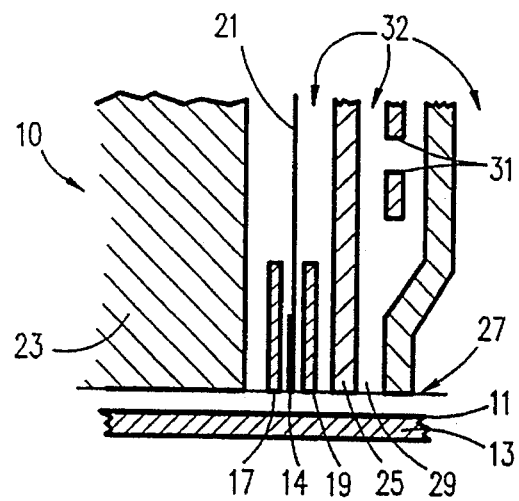
FIGS. 2A and 2B are sectional views of a typical magnetoresistive head illustrating the head elements.
Figure 2B:
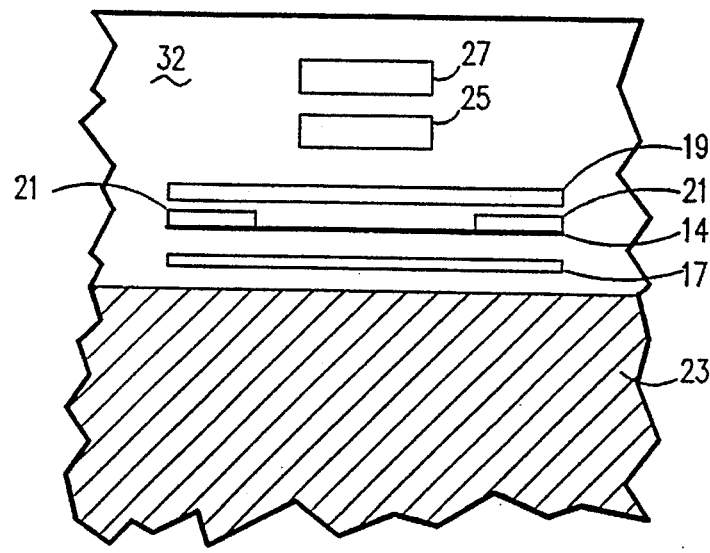
Figure 2C:
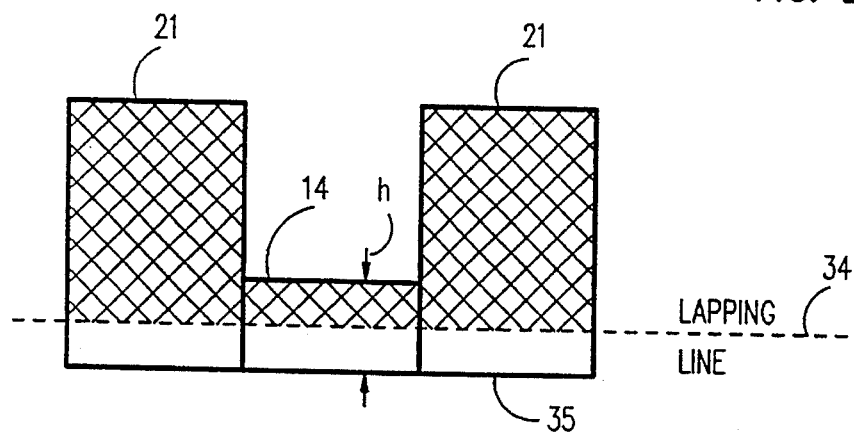
FIG. 2C is a top plan view of an MR element and the associated electrical leads.

Referring now to FIGS. 2A, 2B and 2C, FIGS. 2A and 2B illustrate a portion of a magnetoresistive (MR) read/inductive write magnetic head 10 shown in transducing relationship with magnetic media 13 such that the head air bearing surface 11 (ABS) is disposed in facing relationship with and slightly above the magnetic media. FIG. 2B shows the magnetic head as viewed from the ABS 11 illustrating the head read/write elements exposed at the ABS. Typically, such a head 10 includes an MR read assembly and an inductive write assembly formed adjacent one another on a substrate 23 surface. The substrate surface is typically a vertical surface forming a vertical side of a slider (not shown) carrying the magnetic head.

The MR read assembly comprises an MR sensing element 14 fabricated of a ferromagnetic material such as a nickel-iron (NiFe) alloy, for example, which is enclosed or sandwiched by first and second magnetic shield elements 17 and 19. The MR sensing element can comprise a single layer of NiFe, commonly referred to as permalloy. More typically, the MR sensing element will comprise a multilayer magnetic structure, including magnetic bias layers, of the type described in U.S. Pat. No. 4,785,366 or of the type described in U.S. Pat. No. 5,206,590. The shield elements 17 and 19 are generally fabricated of a highly permeable magnetic material such as permalloy or Sendust, a trialloy of aluminum-silicon-iron. The magnetic shield elements 17 and 19 minimize or eliminate magnetic interference with the MR element 14. Electrically conductive leads 21, generally of tantalum (Ta) or other suitable conductive material, attached electrically at the end portions of the MR element 14, couple the MR element to external circuitry (not shown) to provide a means for sensing the electrical resistance of the MR element.

The MR read assembly is formed by well-known vacuum deposition techniques, such as sputter deposition, for example, on the substrate 23. The various elements of the MR assembly are surrounded and insulated from each other by layers 32 of insulating material, such as silicon dioxide or aluminum oxide, for example.

The inductive write assembly comprises a lower or first pole piece 25 and an upper or second pole piece 27. The first and second pole pieces 25, 27 are made of highly permeable magnetic material such as NiFe, for example, and form a magnetic circuit magnetically connected together at a back gap portion (not shown) with the first and second pole pieces 25 and 27 forming a magnetic gap 29 at the ABS 11. One or more layers of electrical conductors 31, generally made of electroplated copper (Cu), for example, form an inductive coil 31 disposed between the first and second pole pieces 25, 27. The inductive coil 31 is also connected to external circuitry via conductive leads (not shown). The pole pieces 25, 27 and inductive coil conductors 31 are fabricated by well-known processes such as electroplating or sputter deposition, for example. The pole pieces are insulated electrically from the inductive coil and the MR read assembly by layers 32 of insulating material. Additionally, the entire assembly is covered and protected with a capping layer of insulating dielectric material 32.

As seen more clearly in FIG. 2B, the MR read assembly magnetic shield elements 17, 19, the MR read element 14 and its lead conductors 21 and both inductive pole pieces 25, 27 terminate in or are exposed at the ABS 11. FIG. 2C is a plan view illustrating the MR read element 14 and the conductive leads 21 formed in the MR element end regions. When initially deposited, the height h of the MR element 14 is greater than required for optimum performance of the magnetic head. The excess portion 35 of the MR element 14 is removed by a lapping or grinding process to provide an MR element having a desired height as indicated by the lapping line 34.

Figure 3A:
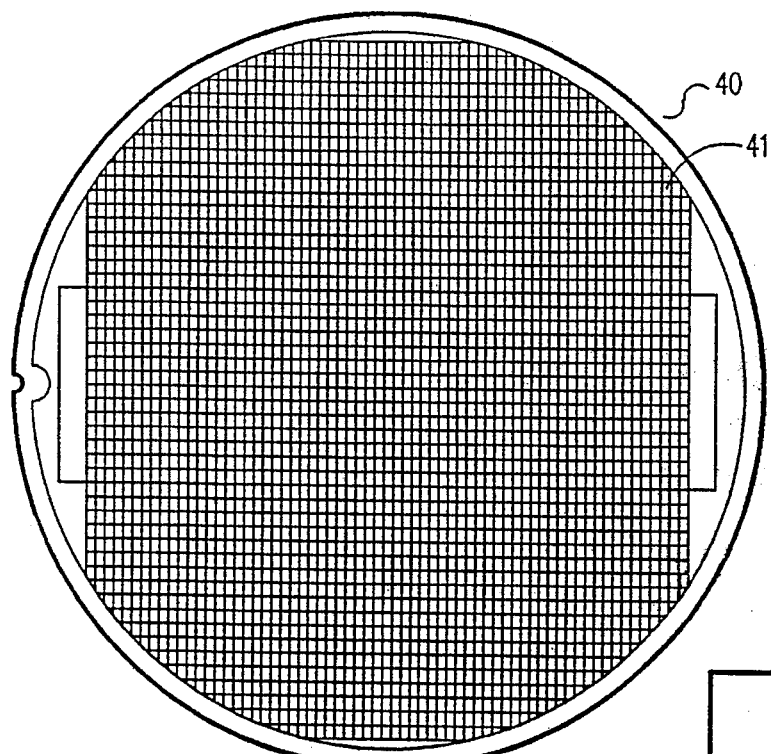
FIGS. 3A and 3B are plan views of a wafer illustrating the formation of magnetic transducers in rows and columns.
Figure 3B:
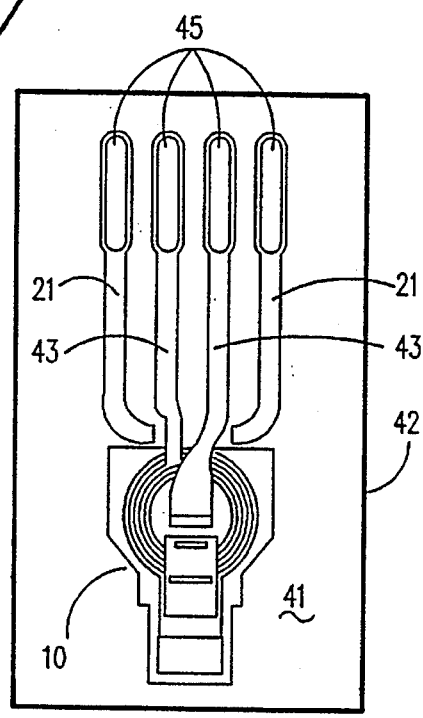

Referring now also to FIGS. 3A and 3B, FIG. 3A illustrates a wafer 40 comprising substrate 23 of a suitable material having magnetic transducers 41 formed thereon in rows and columns. When the magnetic transducers 41 are designed for use in a rotating magnetic disk drive system, the magnetic transducer 41 typically will include the slider and the thickness of the wafer substrate will be equal to the length of the finished slider and the magnetic transducers will be batch processed in row operations as described in the above referenced U.S, Pat. No. 4,914,868, for example. If the magnetic transducers 41 are designed for use in a magnetic tape storage system the wafer 40 is typically cut, "diced", into chips 42 and the individual heads processed separately. After processing, the individual magnetic transducer chips 42 are glued or otherwise bonded to a slider or other support means for use in the magnetic tape drive system (not shown). As shown in FIG. 3B, the magnetic transducer 41 comprises a magnetic head 10 having a pair of electrically conductive leads 21 connected to the MR element 14 (as shown in FIG. 2C) and a pair of electrically conductive leads 43 connected to the inductive coil 31. The conductive leads 21,43 terminate in terminals 45 for further connection to external circuitry. The physical size of the transducer chip 42 is determined by the size and number of the terminal pads 45 and their associated conductive leads 21, 43, and the required clearance between the head 10 and the pads for bonding external leads to the pads. The transducer components having the principal effect on the physical size required for the transducer chip 42 are the number of conductive leads 21 and 43 and terminal pads 45. In order to maximize the number of magnetic transducers 41 which can be fabricated from a single wafer 40, it is desirable to minimize the physical size of the magnetic transducer chip 42. Thus by minimizing the number of conductive leads 21, 43 and their terminal pads 45, the overall physical size of the magnetic transducer chip 42 may be minimized.

Figure 5:
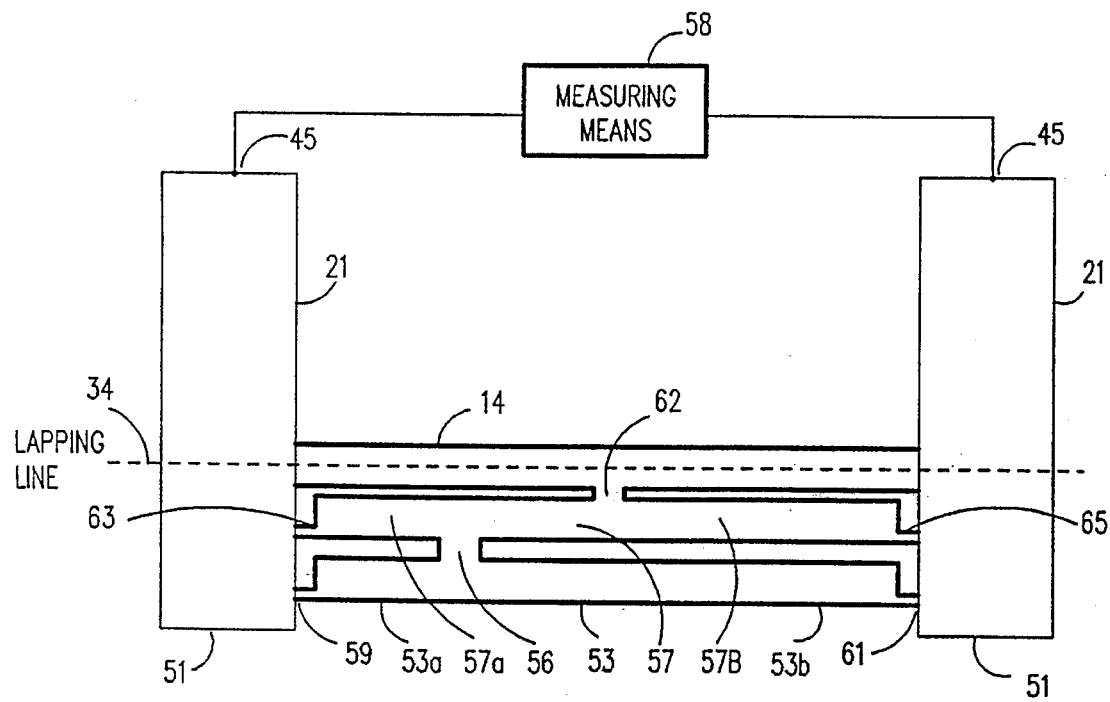
FIG. 5 is a plan view of a magnetic head according to the principles of the present invention.

Referring now also to FIG. 5, an MR read assembly 50 constructed according to the principles of the present invention is shown. The MR read assembly 50 comprises an MR read element 14 having conductive leads 21 formed at each end, the conductive leads 21 having extensions 51. At the same time the MR read element 14 is deposited, shunt resistors 53 and 57 are also deposited. Shunt resistor 53 is connected to the conductive lead extensions 51 at connecting tabs 59 and 61 and to shunt resistor 57 at connecting tab 56. Shunt resistor 57 is connected to the conductive lead extensions 51 at connective tab 63 and 65 and to the MR read element 14 at connective tab 62, The shunt resistors 53, 57 will be deposited at the same time and will be of the same material as the MR read element 14. As discussed above with reference to FIG. 2C, the conductive lead extensions 51 and the shunt resistors 53, 57 comprise excess material that will be removed during the lapping process to provide the MR read element 14 with a desired height h as indicated by the lapping line 34. The measuring means 58, such as an Ohmmeter, for example, is connected between the conductive leads 21 to measure the total resistance of the resistor network formed by the shunt resistors 53 and 57 and the MR element 14 during the lapping process.

Figure 6:
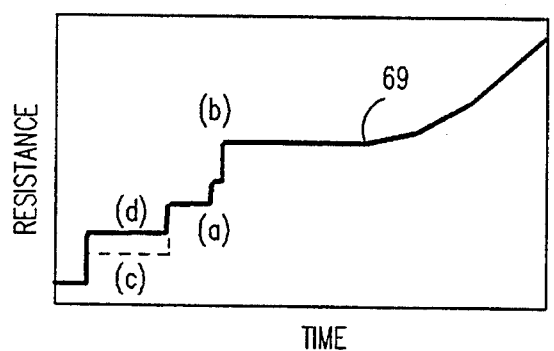
FIG. 6 is a graph illustrating the resistance increases measured between the MR element leads of FIG. 5 as the lapping process progresses.

Referring now also to FIG. 6, curve 61 illustrates the total resistance between the conductive leads 21 during the lapping process. As the lapping process proceeds, either connection tab 59 or 61 will first lap through disabling, i.e., removing from the circuit, resistor portion 53a or 53b, respectively. The resistor portions 53a and 53b are used as an initial lapping monitor to determine the amount of lapping skew, i.e., the degree of tilt of the lapping surface with respect to the length of the MR read element 14. After the resistance changes due to the disabling of the resistor portions 53a and 53b, an adjustment is made to the lapping angle by adjusting the pressure applied along the MR element by the mechanical lapping apparatus (not shown). Shunt resistor 57 then serves to verify that the skew correction made is correct. As shown in FIG. 5, resistor portions 53a and 53b are of different lengths. This provides discrimination between positive and negative skews as determined by the amount of the resistance change/increase in either connection tab 59 or connection tab 61 is lapped through.

As the lapping process proceeds, if, for example, the connecting tab 59 is lapped through, disabling resistor portion 53a, prior to connecting tab 61 being lapped through indicating that the left side of MR element 14 (as shown in FIG. 5) is being lapped further than the right side, the total resistance will follow the dashed line c (as shown in curve 69). If the lapping skew is of the opposite angle, connecting tab 61 will be lapped through before connecting tab 59 and the resistance will follow the solid line d. Differential adjustment to the lapping pressure is then made in proportion to the time between increases in the resistance. The sign of the differential adjustment must be made in accordance with the resistance change, i.e., the path c or the path d. As the lapping proceeds, shunt resistor 53 being removed, the connecting tabs 63 and 65 for shunt resistor 57 will be lapped through. When the connecting tabs 63 and 65 are lapped through disabling resistor portions 57a and 57b, respectively, there will be corresponding increases in the resistance a, b, respectively, as shown by curve 69. A reduction in the time between the resistance increases a, b compared to the time between the resistance increases c, d is a measure of the reduction of lapping skew as a result of the differential adjustment to the lapping pressure. At this point in the lapping process, a further adjustment to the differential pressure may be made, if desired, to reduce or eliminate any remaining lapping skew prior to lapping the MR element 14.

While only two shunt resistors 53, 57 are shown in this preferred embodiment, the resistor network can include additional shunt resistors, three, four or five shunt resistors, for example. As the lapping process progresses through the resistor network, continuous adjustments and refinements to the differential pressures on the MR element 14 can be made to converge on a zero skew angle.

Figure 7:
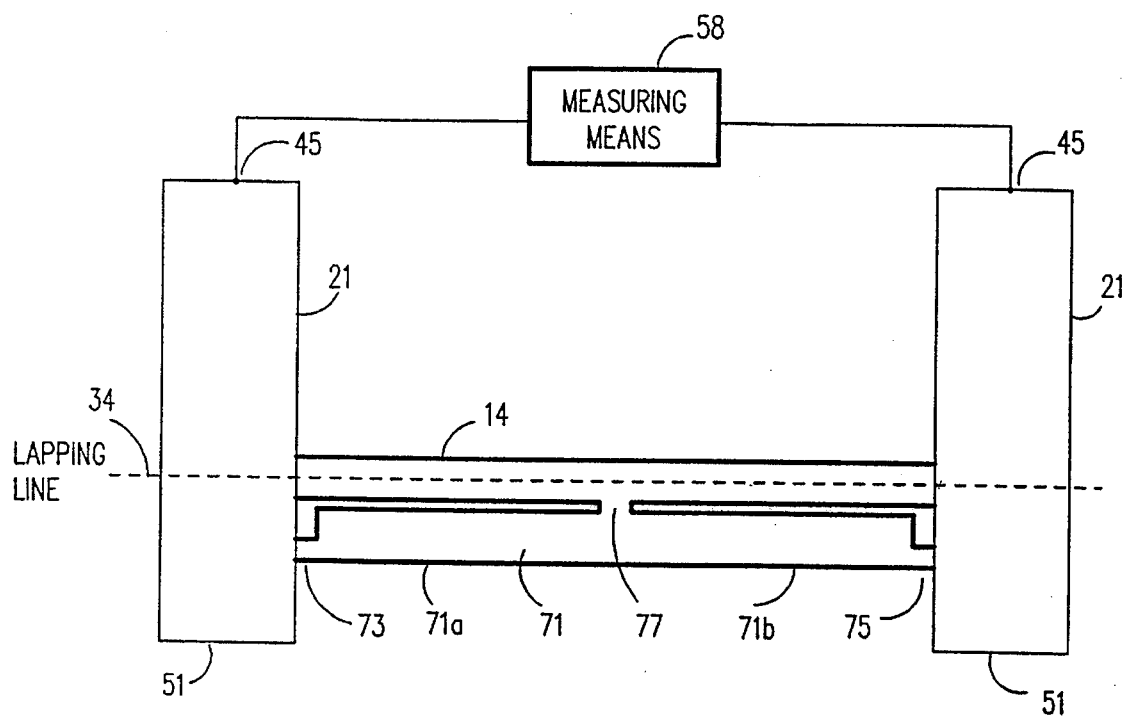
FIG. 7 is a plan view illustrating another preferred embodiment of the MR head according to the present invention.
Figure 8:
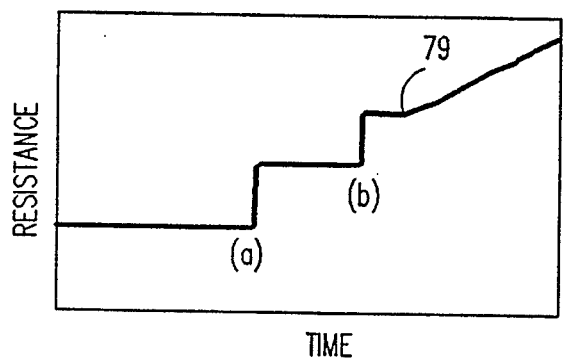
FIG. 8 is a graph illustrating the resistance increases as measured between the leads of the MR element shown in FIG. 7 during the lapping process.

Referring now also to FIGS. 7 and 8, another preferred embodiment of an MR head according to the principles of the present invention is shown. The MR head 70 comprises an MR read element 14 having electrically conductive leads 21 formed in its end regions. A single shunt resistor 71 is connected between conductive lead 21 extensions 51 by connecting tabs 73 and 75. Shunt resistor 71 is also connected to the MR element 14 by connecting tab 77. As described above with reference to FIG. 5, the shunt resistor 71 is deposited at the same time the MR element 14 deposited and is of the same material. Measuring means 58 is connected between the conductive leads 21 to provide a measurement of the total resistance between the conductive leads 21. As the lapping process proceeds, either connecting tab 73 or connecting tab 75 will lap through disabling resistor portion 71a or 71b, respectively. When either connecting tab 73 or 75 laps through, an increase in the resistance monitored by measuring means 58 will occur as illustrated at point a on curve 79 in FIG. 8. As the lapping process proceeds further, the other connecting tab will lap through disabling the other resistor portion resulting in a second increase in resistance as shown at point b of curve 79. The lapping skew is then calculated from the lapping rate and the time between the two resistance increases a, b.

It is important to note that the embodiment shown in FIG. 7 provides only a monitoring of the lapping skew. While the mechanical lapping mechanism could be adjusted to compensate for the skew with differential pressure along the head element in proportion to the time between resistance jumps, the value of pressure difference would have to be determined empirically since there is no subsequent check of the skew prior to lapping the MR element 14.

Figure 9:
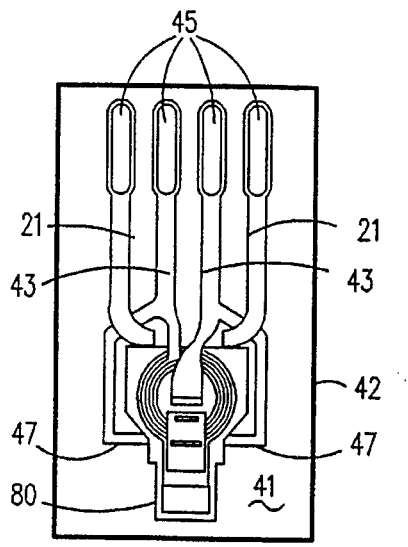
FIG. 9 is a plan view of another preferred embodiment of a magnetic head according to the present invention.
Figure 10A:
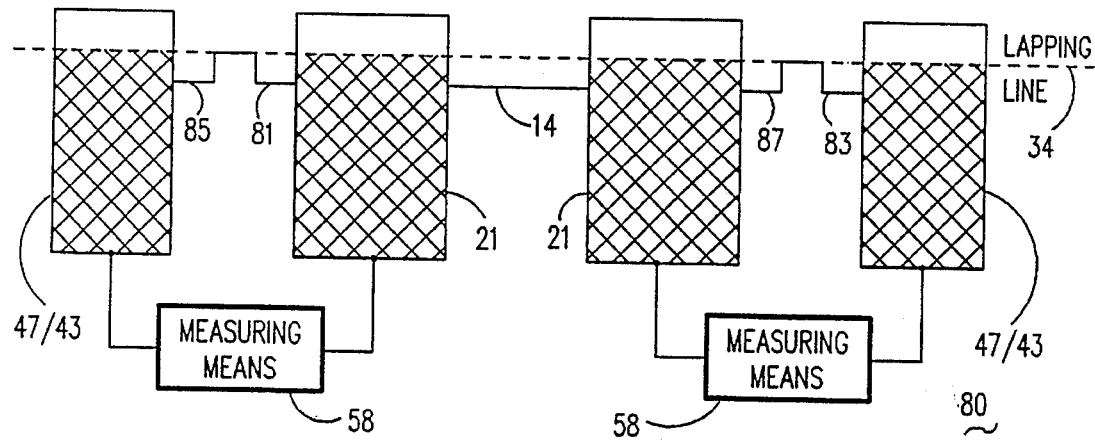
FIGS. 10A and 10B are plan views of the MR element and associated electrical leads before and after the lapping process for the magnetic head shown in FIG. 9.
Figure 10B:
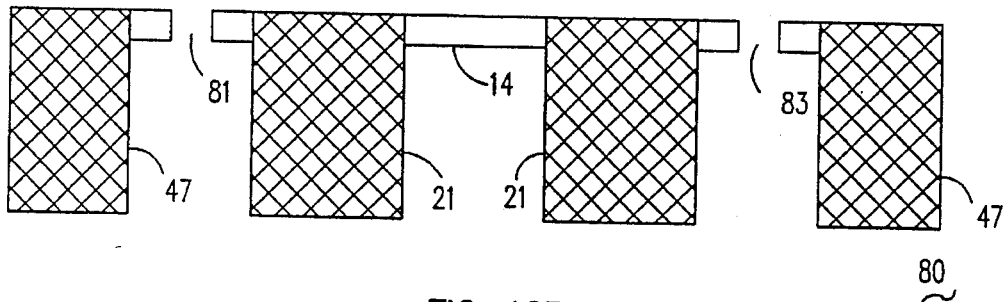

Referring now also to FIGS. 9, 10A and 10B, another preferred embodiment of the MR head according to the principles of the present invention is shown. The MR head assembly 80 comprises the MR read element 14 having electrical lead conductors 21 formed in its end regions. At the same time the MR element 14 is deposited, additional MR elements 85 and 87 are deposited adjacent to the MR element 14 on opposite ends thereof such that the conductive leads 21 are also connected to one end of both MR element 85 and MR element 87. As shown more clearly in FIG. 9, the electrical conductive leads 43 provided for the head 80 inductive coil (inductive coil 31 as shown in FIG. 2A) are fabricated with lead extensions 47 also connecting leads 43 to the opposite ends of the MR element 85 and MR element 87, respectively. A measuring means 58 is then connected between each pair of leads 21 and 43, respectively, to measure the resistance of the MR elements 85 and 87. Thus prior to the lapping process, the conductive leads 43 for the inductive coil are connected both to the inductive coil and to the MR elements 85 and 87. Each MR element 85, 87 has a notch 81,83, respectively, formed therein. The notch 81, 83 is recessed exactly to the lapping line 34. During the lapping operation, the resistances of the MR element 85 and of the MR element 87 are monitored. During the lapping process, as the excess material of the MR elements and leads is ground away, the resistance of the MR elements 85 and 87 steadily increases. When the lapping line 34 is reached, the resistances of the MR elements 85 and 87 will jump to an extremely high value indicating that the floor of the notches 81, 83 have been lapped through and the desired height for the MR element 14 has been achieved. When the notches 81,83 lap through, the corresponding inductive coil lead extension 47 is no longer connected to the MR element 14. If one notch 81,83 laps through before the other notch, some degree of skew in the lapping operation is indicated. The lapping operation may be terminated at this point or alternatively, the lapping operation may be continued until the resistance of the remaining MR element 85 or 87 becomes high. The amount of lapping skew can then be calculated using the known lapping rate and the time between the jump in resistance for the two MR elements 85 and 87.

The embodiment shown in FIGS. 10A and 10B provides only a monitoring capability allowing lapping skew to be detected and calculated. The differential lapping pressure along the MR element 14 may be adjusted empirically during the lapping of a number of MR heads 80 to provide an acceptable, minimum amount of skew in the lapping operation.

While the present invention has been particularly shown and described with reference to the preferred embodiments thereof, it will be understood by those skilled in the art that various changes in form and detail may be made therein without departing from the spirit, scope and teaching of the invention. Accordingly, the invention herein disclosed is to be considered merely as illustrative and limited in scope only as specified in the appended claims.

We claim:

1. A method of manufacturing a magnetoresistive head, comprising the steps of:

depositing a magnetoresistive element on a substrate, said magnetoresistive element having end regions separated by a central region;

depositing first and second electrically conductive leads in contact with said magnetoresistive element in said end regions, each said conductive lead having a portion extending beyond said magnetoresistive element;

depositing at least one shunt resistor between said magnetoresistive element and an air bearing surface, said shunt resistor being electrically connected at a first end thereof to said extending portion of the first conductive lead and being electrically connected at a second end thereof to said extending portion of the second conductive lead, sand shunt resistor being electrically connected at a central point thereof to said magnetoresistive element in said central region, said shunt resistor and said MR element forming a resistor network;

lapping said air bearing surface for removing said shunt resistor, said extending portions of the conductive leads and portions of said magnetoresistive element for providing a magnetoresistive element having a desired element height; and monitoring the electrical resistance of said resistive network during said lapping for determining the amount of lapping skew.

2. A method as in claim 1 wherein the step of depositing at least one shunt resistor comprises the step of depositing a single shunt resistor.

3. A method as in claim 1 wherein the step of depositing at least one shunt resistor comprises the steps of depositing a first shunt resistor, said first shunt resistor being electrically connected at a first end thereof to said extending portion of the first conductive lead and being electrically connected at a second end thereof to said extending portion of the second conductive lead, said first shunt resistor being electrically connected at a central point thereof to said magnetoresistive element in said central region, and a second shunt resistor, said second shunt resistor being electrically connected at a first end thereof to said extending portion of the first conductive lead and being electrically connected at a second end thereof to said extending portion of the second conductive lead, said second shunt resistor being electrically connected at a point disposed between said first and second ends thereof to said first shunt resistor; and the step of monitoring the electrical resistance of said resistive network includes the further step of adjusting a lapping skew angle with respect to the length of said magnetoresistive element central region in response to the removal of said second shunt resistor during said lapping step.

* * * * *